United States Patent
Eiwen et al.

(10) Patent No.: US 7,988,452 B2
(45) Date of Patent: Aug. 2, 2011

(54) TEST HEAD FOR PROTECTIVE MASK TESTING AND TEST HEAD SYSTEM

(75) Inventors: Roland Eiwen, Lübeck (DE); Björn Ehler, Lübeck (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 415 days.

(21) Appl. No.: 12/126,070

(22) Filed: May 23, 2008

(65) Prior Publication Data

US 2009/0288504 A1 Nov. 26, 2009

(51) Int. Cl.
G09B 23/00 (2006.01)
G01M 3/26 (2006.01)

(52) U.S. Cl. ........... 434/270; 434/262; 434/267; 73/40; 73/46; 73/866.4

(58) Field of Classification Search .............. 73/584, 73/585, 649, 40, 46, 866.4; 434/262, 263, 434/267, 270, 272, 274
See application file for complete search history.

(56) References Cited

U.S. PATENT DOCUMENTS

| | | | | |
|---|---|---|---|---|
| 129,086 A * | 7/1872 | Benda | | 446/391 |
| 1,339,620 A * | 5/1920 | Hart | | 285/148.14 |
| 1,543,356 A * | 6/1925 | Arnold | | 285/314 |
| 2,199,049 A * | 4/1940 | Greenberg | | 446/100 |
| 3,010,223 A * | 11/1961 | Alderson | | 434/267 |
| 3,090,155 A * | 5/1963 | Gordon | | 446/92 |
| 3,096,097 A * | 7/1963 | Roddy | | 279/5 |
| 3,106,041 A * | 10/1963 | Kahn | | 446/327 |
| 3,198,408 A * | 8/1965 | Benner | | 223/66 |
| 3,199,225 A * | 8/1965 | Robertson et al. | | 434/265 |
| 3,305,146 A * | 2/1967 | Cram | | 223/68 |
| 3,419,993 A * | 1/1969 | Rodgers | | 446/100 |
| 3,464,146 A * | 9/1969 | McCurdy | | 446/100 |
| 3,707,782 A * | 1/1973 | Alderson | | 434/267 |
| 3,934,804 A * | 1/1976 | Bruce | | 248/229.15 |
| 4,209,919 A * | 7/1980 | Kirikae et al. | | 434/270 |
| 4,596,528 A * | 6/1986 | Lewis et al. | | 434/270 |
| 4,657,274 A * | 4/1987 | Mann et al. | | 280/433 |
| 4,691,556 A * | 9/1987 | Mellander et al. | | 73/12.01 |
| 4,796,467 A | 1/1989 | Burt et al. | | |
| 4,802,857 A * | 2/1989 | Laughlin | | 434/265 |
| 5,046,986 A * | 9/1991 | Wood et al. | | 446/321 |

(Continued)

FOREIGN PATENT DOCUMENTS

DE 100 58 901 A1 5/2002

(Continued)

*Primary Examiner* — David A. Rogers
(74) *Attorney, Agent, or Firm* — McGlew and Tuttle, P.C.

(57) ABSTRACT

A test head (10) for breathing mask testing includes a hard head part (12) formed of a hard material and includes a face side (18) and a soft face front (14) of a defined thickness applied to the face side (18) of the hard head part (12). The soft face front (14) has a simulated human face surface defining a mask seal contact surface (22). A breathing mask testing system is also provided including the testing head (10) including a human face surface defining a mask seal contact surface (18) and a mouth opening connected to a respiration tube (50). A testing device (32) is provided with a test head adapter (30) protruding from the testing device (32). The hard head part (12) has a support portion (29) with an adapter interface for the adapter (30). The adapter interface includes a rotational position fixing mechanism for fixing the hard head part (10) to the adapter (30) in one of a plurality of rotational positions.

13 Claims, 4 Drawing Sheets

U.S. PATENT DOCUMENTS

| | | | | |
|---|---|---|---|---|
| 5,090,910 A * | 2/1992 | Narlo | | 434/82 |
| 5,195,896 A * | 3/1993 | Sweeney et al. | | 434/265 |
| 5,289,819 A * | 3/1994 | Kroger et al. | | 128/200.24 |
| 5,540,592 A * | 7/1996 | Scheinberg et al. | | 434/265 |
| 5,566,867 A * | 10/1996 | Goray | | 223/66 |
| 5,580,255 A * | 12/1996 | Flynn | | 434/265 |
| 5,584,125 A * | 12/1996 | Prete | | 33/501.45 |
| 5,724,677 A * | 3/1998 | Bryant et al. | | 2/206 |
| 5,808,182 A | 9/1998 | Stumpf | | |
| 6,109,921 A * | 8/2000 | Yau | | 434/100 |
| 6,203,396 B1 | 3/2001 | Asmussen et al. | | 446/376 |
| 6,467,908 B1 * | 10/2002 | Mines et al. | | 353/28 |
| 6,659,315 B2 * | 12/2003 | Talaric et al. | | 223/66 |
| 6,758,717 B1 * | 7/2004 | Park et al. | | 446/391 |
| 7,186,212 B1 * | 3/2007 | McMullen | | 600/38 |
| 7,311,645 B1 * | 12/2007 | Lynch et al. | | 482/142 |
| 7,419,376 B2 * | 9/2008 | Sarvazyan et al. | | 434/273 |
| 7,587,929 B2 * | 9/2009 | Zielinski et al. | | 73/49.8 |
| 7,614,280 B1 * | 11/2009 | Gardner et al. | | 73/40 |
| 2001/0007255 A1 * | 7/2001 | Stumpf | | 128/200.24 |
| 2001/0012609 A1 * | 8/2001 | Pastrick et al. | | 434/265 |
| 2002/0083783 A1 * | 7/2002 | Ahn | | 73/866.4 |
| 2005/0196741 A1 * | 9/2005 | Otto | | 434/271 |
| 2007/0038331 A1 * | 2/2007 | Hanson | | 700/245 |
| 2007/0105082 A1 * | 5/2007 | Laerdal et al. | | 434/265 |
| 2007/0131043 A1 * | 6/2007 | Frost | | 73/866.4 |
| 2007/0238388 A1 * | 10/2007 | Morehead | | 446/394 |
| 2009/0173173 A1 * | 7/2009 | Limbrick et al. | | 73/866.4 |

FOREIGN PATENT DOCUMENTS

| | | | |
|---|---|---|---|
| DE | 201 21 789 U1 | | 6/2003 |
| FR | 14 29 204 A | | 2/1966 |
| JP | 2003111653 A | * | 4/2003 |
| JP | 2005080794 A | * | 3/2005 |

* cited by examiner

_US 7,988,452 B2_

TEST HEAD FOR PROTECTIVE MASK TESTING AND TEST HEAD SYSTEM

FIELD OF THE INVENTION

The invention pertains to testing devices for personal protective gear and in particular to the testing of breathing masks. The invention provides a test head for protective mask testing and test head system.

BACKGROUND OF THE INVENTION

Breathing masks have been used for a long time for civil and military applications. These breathing masks protect the user from nuclear, biological and chemical substances, smoke, aerosols, gases and other substances in the ambient air. It is therefore extremely important that these breathing masks be tested properly in order to ensure that they will protect the user from these life-threatening substances.

The following tests are performed on the breathing masks:
Leakage test
Test for opening pressure.

Test heads for testing full masks are used. Test heads support the mask for testing of sealing as well as filtering and respiration systems and other mask characteristics. The testing is done via a testing device, on which the test head is mounted. The testing device may be supplied with compressed air or another pressurized source (e.g., bellows, rotary compressor, hand ball pump, etc.) for various purposes including the tests as noted and for Closed Circuit Breathing Apparatus (CCBA) or Self Contained Breathing Apparatus (SCBA) for an inflatable test head for testing a full face mask and testing chemical protection suits. The lung demand valve and the nozzle, which inflates the chemical protection suits may be fed through plug-in couplings.

SUMMARY OF THE INVENTION

It is an object of the invention to provide a test head that can be easily removed from and mounted on the testing device by means of a mechanism. It is a further object, according to another aspect of the invention to provide a test head to simulate a human face as realistically as possible in order to thus recognize defects of the sealing of the mask even better and, on the other hand, to guarantee the use of different sizes of breathing masks.

The invention is related to Self Contained Breathing Apparatus (SCBA) testing, Close Circuit Breathing Apparatus (CCBA) testing, Self Contained Underwater Breathing Apparatus (SCUBA) testing, Lung Demand Valve (LDV) testing and mask testing. The test head is necessary for testing face masks.

According to the invention a soft face front (SFF) is provided for the test head. The SFF is also referred to herein as a gel front and as further described below is used as a replaceable face, which is used on test heads for testing masks. The gel face should be placed as a kind of layer on a fixed face front and attached. The mechanical requirements include allowing a shock and pressure stress of the mask and straps only in which the mechanical stresses are relatively low. Shear stresses should occur to a low extent. The SFF allows for abrasion as breathing masks are placed on the test head up to 50 times a day. The overall service life for the SFF should be at least e.g., 1 year. The materials encountered in testing may include the material of the head straps: EPDM-rubber with metal clasps and the material of the mask body: EPDM-rubber; silicone is also possible. The chemical requirements include for cleaning, the surface should be able to be cleaned easily with water and a washing-up liquid (not absolutely necessary, but desirable). The atmospheric influences are based on the testing device being placed mostly on a work bench; it could also be placed at a window, and exposure to sunlight (filtered through the glass) is consequently probable. The material should be additionally resistant to dust and dirt.

Further general requirements of the SFF relate to the material simulating the properties of a human face. A certain stretching (approx. 5% to 10%) of the material should be possible in one direction. The gel face is easily replaceable and fixable. The gel front is not able to be detached too easily during use after fixing.

According to a preferred embodiment the test head is similar externally to a human head. The SFF simulates the human skin/face so that mask testing is more realistic. Parts of the test head additionally simulate the consistency (in terms of elasticity, frictional surface and surface characteristics) of a human face. The test head comprises a hard head part, which simulates the back of the head and the face. The hard head part may especially be metallic or made of a hard synthetic or plastics material. The SFF is provided of a defined thickness. The SSF is the surface with which the seal of the mask will be in contact. The SSF is bonded to the hard face of the hard head part. A polyurethane compound or similar material may be provided as an SFF. The SFF simulates the human face. The rear side may be self-adhesive, and the front side or face side is covered with a resistant film. Such an SFF may be replaceable or mounted permanently.

The SFF head area forms part of the overall test head and is fixed to the hard head part. The thickness of the SFF may acceptably be in the range of 4 mm to 25 mm. The thickness of a preferred embodiment of the SFF is approximately 10 mm±5 mm, as the SFF may have different thicknesses. The thickness of the SFF may be about 8 mm in the forehead area. The thickness of the SFF may be about 12 mm at the chin area. Besides the polyurethane compound or similar material provided as the SFF, the material could any material which meets the requirements noted. This may also be for example a siloxane, or a foam. All adhesives are available which allow for easy removal of the SFF and replacement by a new SFF while not allowing the SFF to slip on the hard head part during use. As noted, the SFF may have self-adhesive properties that allow for it to easily be removed while the sticky mass of the polyurethane of a preferred embodiment is very strong in its self adhesion to the hard head part. The resistant foil or resistant film that forms the outer surface (mask sealing surface) of the SFF may likewise be a polyurethane compound. The resistant film protects the SFF against mechanical stress. Other materials that meet the requirements enough may also be used.

Due to the special shape of the gel front and of the head and the special head and face form, it is possible to test all mask sizes. Masks of various sizes and of various sources will fit on the test head according to the invention.

Due to the simulation of the human face by the SFF, sealing is facilitated for the operator of the testing device when the mask is put on. Damage to the seal of the mask is recognized more easily than in case of other usual testing methods.

According to another aspect of the invention a breathing mask testing system is provided with a testing device and a test head. The test head can be rotated about its longitudinal axis in predefined increments and locked by means of a rotational position fixing mechanism. The test head is placed on a head adapter, which protrudes from the housing of the testing device. The breathing adapter includes two respiration tubes and a test head surface. The adapter includes a casing. The mechanism may be based on the adapter having uniformly distributed holes or engagement locations provided at maximum distances of e.g., 90° and a shoulder, on which the head is placed, located on one front side of the head adapter. A hole, in which a securing pin as well as a compression spring are mounted, is located in the support surface of the test head (the base of the hard head part). This securing pin is pushed into the holes of the tube because of the spring force. If the securing pin is pulled, it is possible to rotate the tube and to let it lock in one of the holes.

A rotatable test head considerably facilitates handling for the user of the testing device. The mask can thus be inspected from all sides during testing. When testing Closed Circuit Breathing Apparatus (CCBA) or Self Contained Breathing Apparatus (SCBA), testing is likewise facilitated considerably by rotating the test head to one side.

A preferred embodiment of the breathing mask testing system according to the invention makes possible the simple mounting with rotational fixing means and allows easy removal of the test head from the head adapter, which protrudes from the housing of the testing device. No sensor lines have to be connected or disconnected when mounting or dismounting or turning the head. The respiration tube of the test head may be guided by the holding tube portion of the adapter. The respiration tube is inserted into the holding tube. Two seals at the end of the respiration tube keep free a pressureless space in the holding tube, in which the pressure of the sensor line (conduit to the sensing location) can be picked up. The connection between the sensor line and the measuring point does not have to be established separately during the mounting of the test head on the testing device. The removal of the head makes possible, on the one hand, an even easier transport of the testing device. On the other hand, the head can thus also be retrofitted without greater effort.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
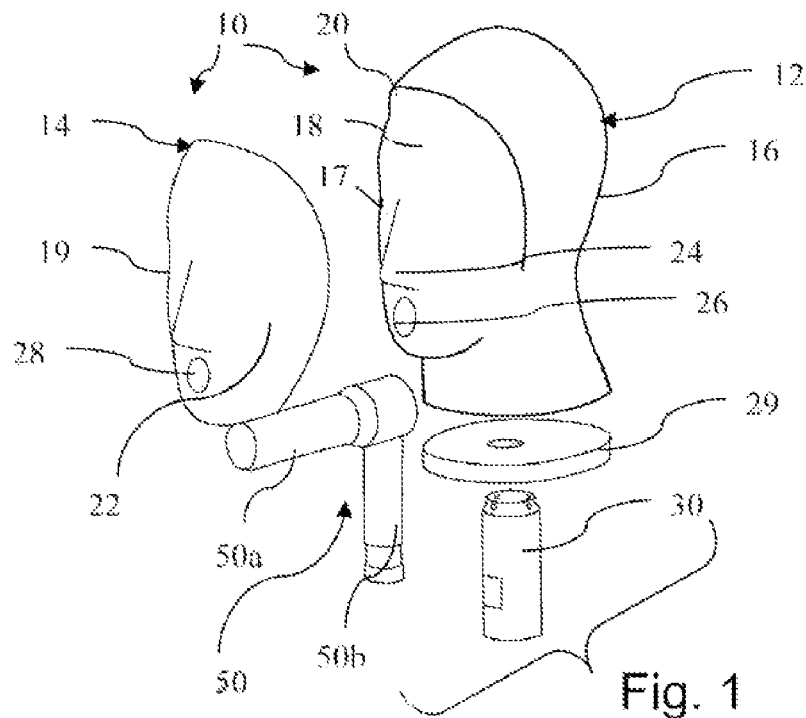
FIG. 1 is a schematic exploded view of a test head according to the invention showing a hard head part (right side) and a soft face front (left side)
Figure 2:
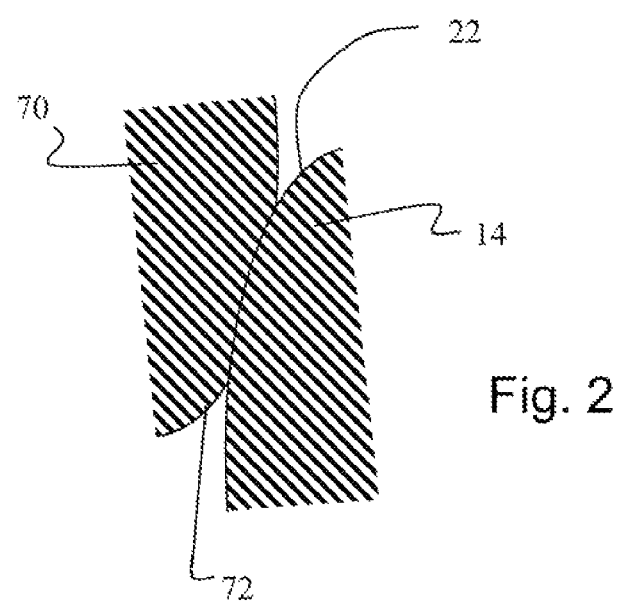
FIG. 2 is a schematic sectional view showing contact between a seal of a mask with the soft face front of the test head shown in FIG. 1.

Referring to the drawings in particular, FIG. 1 shows the test head 10 according to the invention. The test head 10 is based on a hard head part 12 and a Soft Face Front (SFF) 14. The test head 10 with SFF 14 is based on the hard head part 12 having features which simulate the back of the head 16 and the face of a human at a face side 18. The hard head part 12 has a ridge 20 in a transition region between the back of the head 16 and the face side 18. The dimension of the ridge corresponds to a region for receiving the SFF 14. The SFF 14 is of a defined thickness. The SFF 14 provides a contact surface 22, with which the seal of the mask 70 will be in contact. This contact between the contact surface 22 and a sealing surface 72 of the mask 70 is schematically shown in cross section in FIG. 2. The SFF 14 may be bonded to the hard head part 12 to permanently fix the SFF 14 to the hard head part 12 or the SFF may be replaceably mounted to the hard head part 12.

In an advantageous embodiment as shown, a polyurethane compound or similar material is provided as the SFF 14. The SFF 14 simulates the human face. In case of replaceability, no special capabilities or tools are needed to replace the gel front or SFF 14. The rear side may advantageously be self-adhesive, and the front side or face side is covered with a resistant film. The self-adhesive nature can be based on adhesive or based on the frictional contact between the hard face of the hard head part 12 and based on the hard face contour 24 of the hard head part 12 engaging a corresponding inner side face contour of the SFF 14. Based on the matching contours, and based on the materials used, a significant self-adhesive effect may be achieved. If necessary, besides adhesive bonding, other fixing means can be employed.

Figure 5:
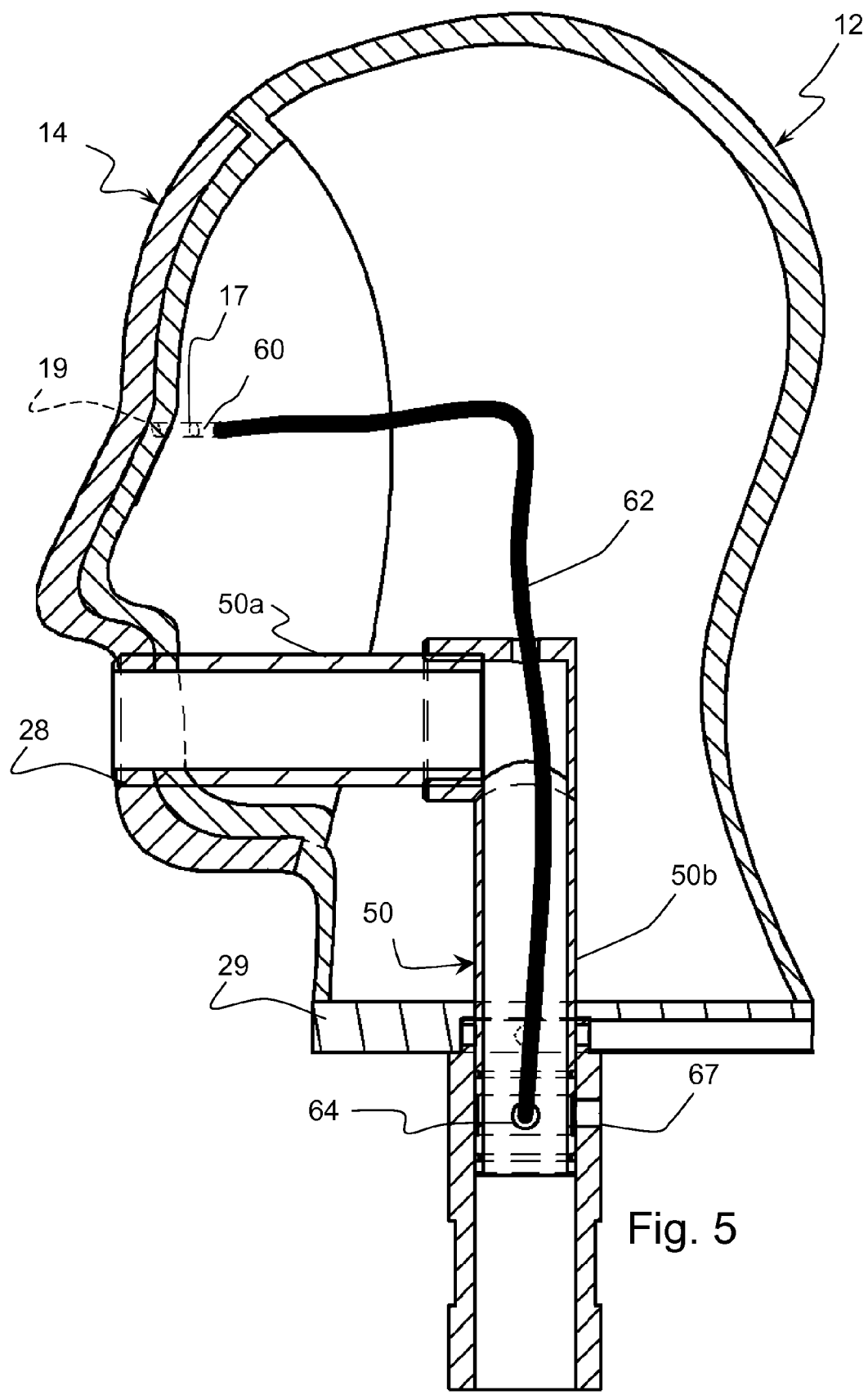
FIG. 5 is a schematic sectional view of the test head according to FIG. 1, with soft face front and hard head part with respiration tube, sensing location and sensor line.
Figure 7:
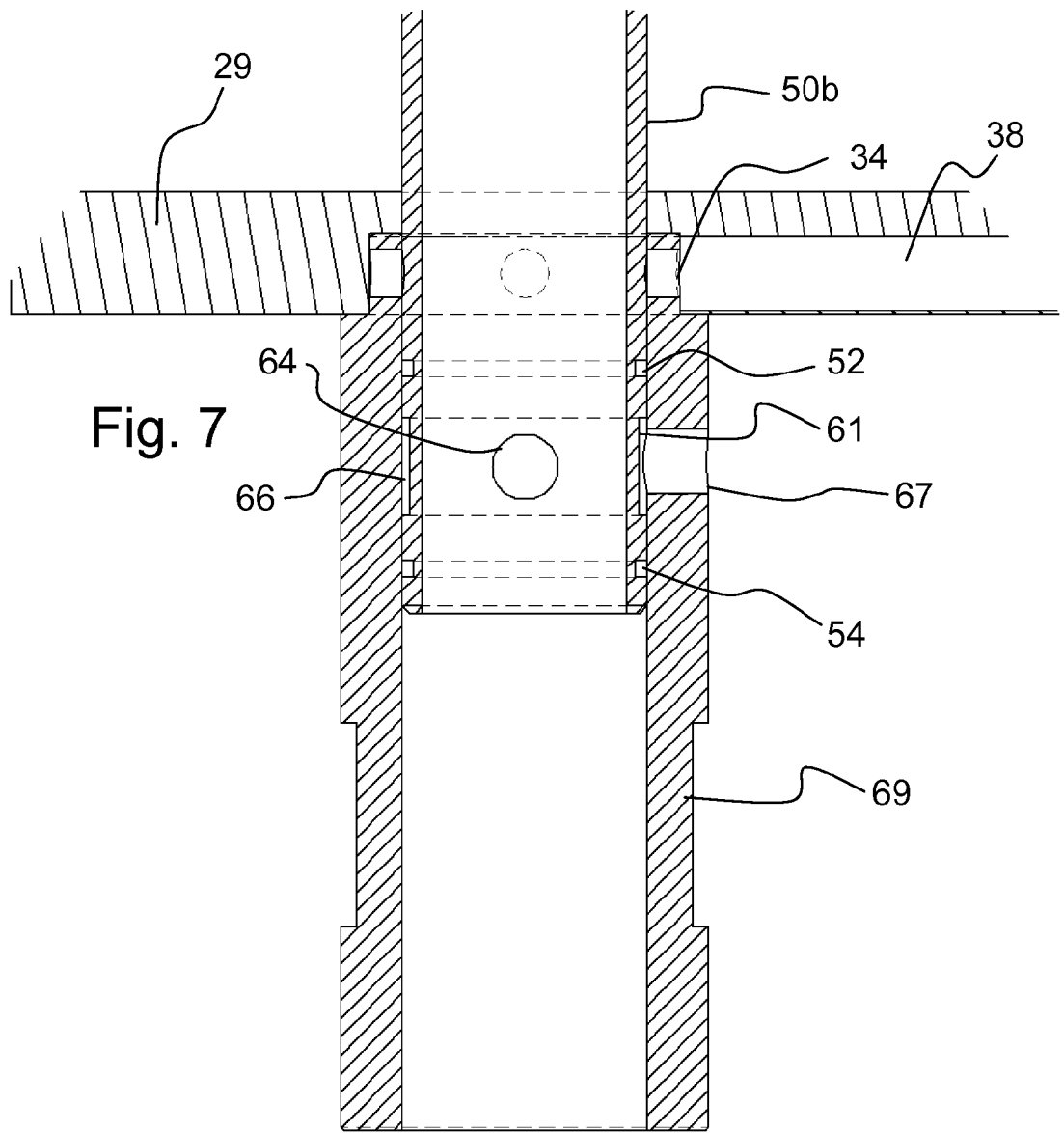
FIG. 7 is a cross-sectional view showing the respiration tube with coupling end with the respiration tube inserted in the head adapter holding tube and also showing the connection of the test head support surface with the fixing/rotational mechanism at a shoulder of the head adapter.

The hard head part 12 includes an opening 26 leading to a respiration tube 50 (FIGS. 5 and 7). The SFF 14 includes a soft face mouth opening 28 aligned with and corresponding to the opening 26. The respiration tube 50 extends through the openings 26 and 28. Due to the special shape of the SFF or gel front 14 and the shape of the hard head part 12, it is possible to test all mask sizes.

Due to the simulation of the human face by the SFF 14, including surface characteristics such as smoothness/texture, frictional characteristics and elasticity, sealing is facilitated for the operator of the testing device 32 when the mask 70 is put on the test head 10. Damage to the seal 72 of the mask 70 is recognized more easily than in case of other usual methods.

Figure 3:
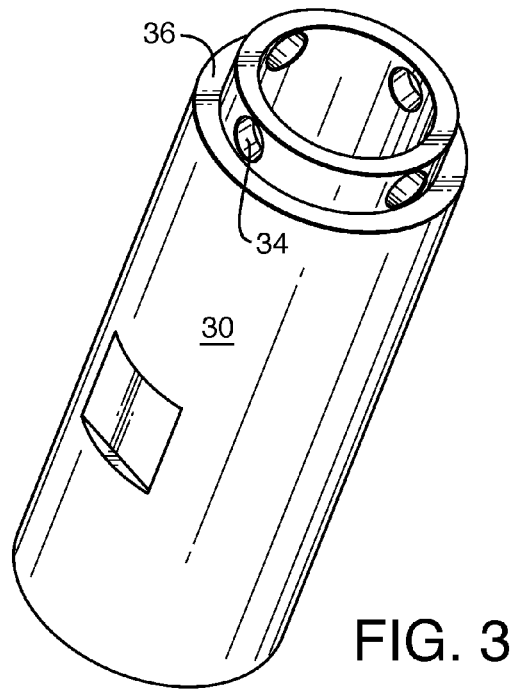
FIG. 3 is a perspective view showing a head adapter which protrudes from a housing of a testing device of a breathing mask testing system according to the invention.
Figure 4:
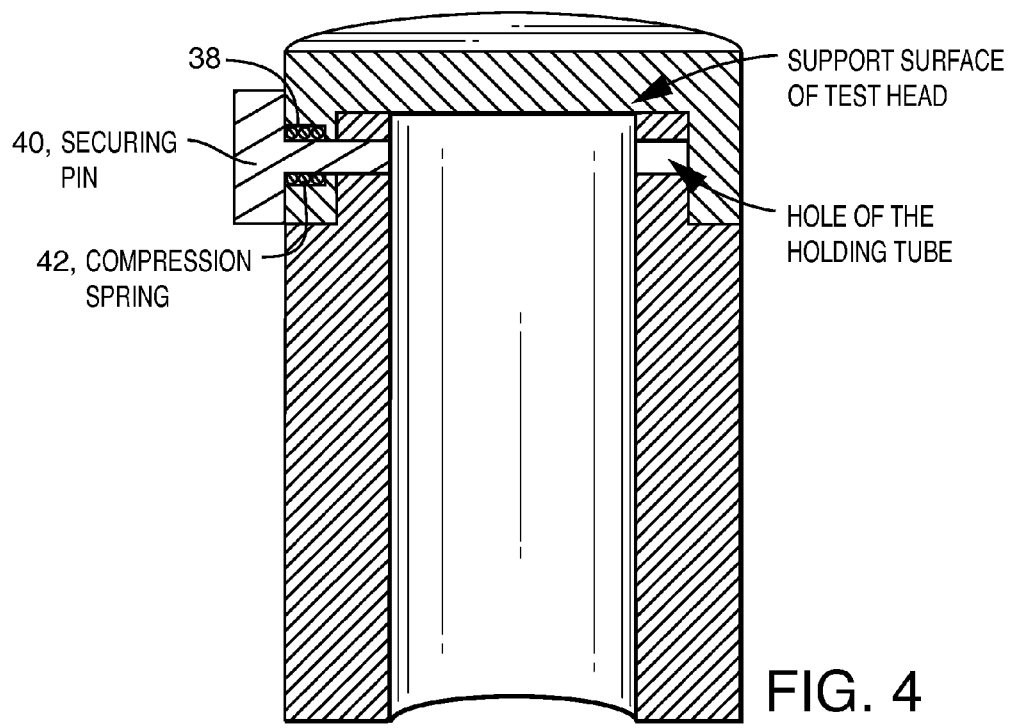
FIG. 4 is a perspective view showing a support surface of a test head connected to the head and adapter of the test device.
Figure 6:
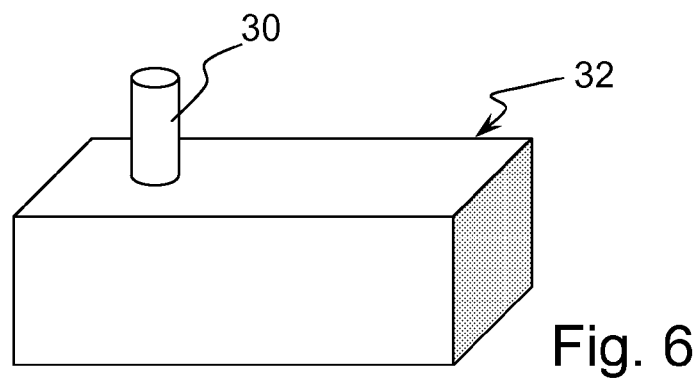
FIG. 6 is a schematic perspective view showing the test device with perch for a head adapter of the breathing mask testing system according to the invention.

FIG. 3 shows a head adapter or device side connection 30 which protrudes from a testing device 32 (FIG. 6). The test head 10 is placed on the head adapter or device side connection 30. Uniformly distributed holes 34 (or some other engagement features/engagement locations) are provided at maximum distances of 90°. The head adapter 30 has a shoulder 36, on which the head is placed. In particular, a support surface 29 engages the circumferential region with the holes 34 and rests on the shoulder 36 located on a front side or front end of the head adapter 30. The head support surface 29 has a hole 38, in which a securing pin 40 as well as a compression spring 42 are mounted. This securing pin 40 is pushed into any one of the holes of the holding tube of the head adapter 30 because of the spring force of the compression spring 42. If the securing pin 40 is pulled, it is possible to rotate the test head assembly including the parts 10, 62, 50 and 29 and to let securing pin 40 lock in one of the other holes 34. The head adapter 30 is mounted into the test device and cannot be rotated. The whole test head assembly (10, 62, 50, 29) can be rotated. FIG. 4 shows the principle of securing in a sectional view.

A rotatable test head considerably facilitates handling for the user of the testing device 32. The mask 70 can thus be inspected from all sides during testing. When Closed Circuit Breathing Apparatus (CCBA) or Self Contained Breathing Apparatus (SCBA), testing is likewise facilitated considerably by rotating the test head 12 to one side.

With the connection by the mechanism including holes 34 on the adapter 30 and compression spring 42 and securing pin 40 a rotational position fixing means is formed to provide a removable test head based on a quick release. The test head 10 may be quickly connected to the adapter 30 of the testing device 32 and the test head 10 may be oriented appropriately based on the rotational fixing aspect of the mechanism. The principle described with reference to FIGS. 3 and 4 also makes possible a simple mounting and removal of the test head 10.

FIG. 5 shows the test head in a sectional view, showing the guiding the respiration tube 50 and the head hard part 12 mounted/bonded on the support surface 29. The respiration tube 50 includes tubes 50a and 50b, both located in the test head 10. Tube 50a establishes the connection to the respiration adapter or simulated breath into the mask body. The tube 50a is mounted in tube 50b (screwed in; however, bonding would also be possible). Tube 50b is provided with two holes, one on the front side and one at the longer end. These holes receive connections for the sensor line 62 from the sensor at the eye location or sensing location 60. Only the general course of the sensor line (a flexible tube) 62 is shown as in FIG. 5.

The SFF 14 is removable and may advantageously be self-adhesive. The SFF 14 seals on the mouth region due to an oversize fitting with tube 50a and the sensor at the eye location 60. The self-adhesive property is brought about by the material polyurethane. Experiments have revealed that the adhesive action of the polyurethane SFF 14 according to the invention is very strong and will very likely be sufficient for fixing the soft face front 14.

FIG. 6 shows the adapter or device side connection 30 protruding from the testing device 32. FIG. 7 shows a detail view of the connection between the holding tube and the test head 10, including the SFF 14 on the hard head part 12 attached to the support 29. The connection mechanism between the test head 10 (hard head part 12, soft face front 14, tube 50a, tube 50b, low-pressure flexible tube (sensor tube) 62 and holding plate support 29) will be described below in more detail. The adapter 30 has, in the upper shoulder, four (or more, depending on the desired angle) fixing holes 34. The holding plate support 29 can be attached to the holding tube 30 through a head side connection which includes the stepped hole region based on shoulder 36. A hole 34 can receive the pin 38, e.g., in the front position by means of the action of the spring 42 located in the holding plate support 29. This pin 38 is pressed into one of the fixing holes 34 by the spring force. The test head 10 is secured in this manner against rotation and slipping out. To rotate or remove the entire test head 10, the spring bolt must be pulled. The test head 10 can now be rotated into another position (depending on the positions of the fixing holes) or removed. The holding tube is mounted sealingly, directly into the adapter holding tube 30. Tube 50b is joined during the insertion of the test head 10 into the head adapter holding tube 30. Two seals 52 and 54 are provided at the end of the respiration tube 50b to create a sealed air flow from the test gas of the simulated lung, e.g. driven by a bellows or a compressed air source, to the mouth opening 28 (and into the space of the mask being tested) and back. An output hole 64 for low pressure at the lower end of tube 50b provides communication between the space 66 and the flexible tube 62 for the low pressure. The same pressure (low pressure) that is present in the low-pressure flexible tube and in the eye location—the sensor location or sensing location 60 prevails in the space 66 between tube 50b and the holding tube 30. This space 66 is created by the shoulder 61 in tube 50b, designated as a smaller diameter in the embodiment shown in FIG. 7. This pressure can be picked up in the output hole 67 of the adapter holding tube 30 for low pressure. The pressure sensor line 62 has a connection to a pressure sensor (not shown) in the test device 32 via the space 66 and the hole 67. The adapter holding tube 30 may also have a wrench profile flat region 69 for connecting or disconnecting the adapter holding tube 30 from the testing device 32.

The testing device 32 simulates respiration with exhaled and inhaled air. This may be done with an artificial lung in the testing device 32. The artificial lung has a hole for the output and input of air. The head adaptor 30 is connected to the hole of the artificial lung so that the exhaled and inhaled air goes through the head adaptor 30. Air provided from the testing device 32 flows through the head adapter 30 and the respiration tubes 50a, 50b. Pressure sensors inside the testing device 32 detect the pressure of exhaled and inhaled air. When testing a breathing mask, a mask is mounted on the test head. All valves of the mask are closed. The artificial lung inhales and creates a pressure inside the mask. The sealing of the mask is correct when the pressure inside the mask stays at the same level during a certain time. The pressure inside the mask will also be inside the sensor line 62, the space 66 and the hole 67. The pressure can be measured at the hole 67.

The removal of the head 10 from the adapter 30 makes possible, on the one hand, an even easier transport of the testing device. On the other hand, the head 10 can be retrofitted without great effort.

While specific embodiments of the invention have been shown and described in detail to illustrate the application of the principles of the invention, it will be understood that the invention may be embodied otherwise without departing from such principles.

LIST OF REFERENCE NUMERALS

| | |
|---|---|
| 10 | test head |
| 12 | hard head part |
| 14 | soft face front (SFF) |
| 16 | back of the test head |
| 17 | opening to eye sensor pressure space |
| 18 | face side of the test head |
| 19 | opening to eye sensor pressure space |
| 20 | ridge in a transition region |
| 22 | SFF contact surface |
| 24 | hard face contour |
| 26 | mouth opening |
| 28 | soft face mouth opening |
| 29 | test head support surface |
| 30 | head adapter |
| 32 | testing device |
| 34 | holes - engagement locations |
| 36 | shoulder |
| 38 | hole in the head support surface |
| 40 | securing pin |
| 42 | compression spring |
| 50 | respiration tube |
| 50a | horizontal respiration tube |
| 50b | vertical respiration tube |
| 52 | respiration tube seal |

| | |
|---|---|
| 54 | respiration tube seal |
| 67 | output hole |
| 60 | eye region sensor location |
| 61 | shoulder |
| 62 | sensor line |
| 64 | low pressure passage opening |
| 66 | low pressure space |
| 69 | flat region (wrench profile) |
| 70 | mask |
| 72 | mask sealing surface |

What is claimed is:

1. A breathing mask testing system comprising:
a testing device with a device side connection, said testing device flowing test gas through said device side connection to test an operation of a breathing mask;
a test head with a head side connection for selectively connecting said test head to, and selectively disconnecting said test head from, said device side connection of said testing device, said head side connection supporting said test head on said device side connection of said testing device, said head side connection also communicating with the test gas flowing through said device side connection, said test head including a human face surface defining a mask seal contact surface and defining a mouth opening, said test head also including a respiration tube communicating said test gases between said mouth opening and said head side connection, said head side connection and said device side connection being shaped to selectively fix said test head to said testing device in any one of a plurality of rotational positions, and to selectively rotate said test head between all of said plurality of rotational positions while said test head is connected to said testing device.

2. A breathing mask testing system according to claim 1, wherein:
said device side connection is provided with a plurality of engagement locations distributed about a circumference of said device side connection;
said head side connection includes a spring biased securing pin for engaging one of said plurality of engagement locations whereby said securing pin can be pulled allowing the test head to be rotated about an axis of said device side connection.

3. A breathing mask testing system according to claim 1, wherein said testing device comprises a positive/negative pressure means for changing and/or setting the pressure within said respiration tube, said positive/negative pressure means being connected to said respiration tube via said device side connection.

4. A breathing mask testing system according to claim 1, wherein said test head includes a sensor or pressure location.

5. A breathing mask testing system according to claim 4, wherein said test head includes a sensor line extending from said sensor or pressure location to within said respiration tube to an access location outside of said respiration tube.

6. A breathing mask testing system according to claim 5, wherein said sensor line terminates at a sensor output at said access location, said respiration tube having first and second sealing locations sealing said access location from an interior of said respiration tube.

7. A breathing mask testing system according to claim 1, wherein:
said test head includes a pressure sensor mask location in an area of said test head that is covered by the breathing mask during testing, said test head also includes a sensor line extending from said sensor mask location to said head side connection;
said device side connection including a pressure port for reading a pressure at said pressure sensor mask location;
said head side connection and said device side connection including a sensor interface for communicating said sensor line with said pressure port when said test head is connected to said testing device, said sensor interface also communicating said sensor line with said pressure port when said test head is in any of said plurality of rotational positions, said sensor interface also disconnecting said sensor line from said pressure port when said test head is removed from said testing device.

8. A breathing mask testing system according to claim 7, wherein:
said pressure sensor mask location is a sensor opening in an eye area of said face surface;
said sensor line extends partially in said respiration tube and inside said head side connection;
said head side connection includes a holding tube positionable inside said device side connection, said test gas flowing through said holding tube, said holding tube and said device side connection defining an annular recess between said holding tube and said device side connection, said sensor line communicating said sensor opening with said annular recess, said pressure port being in communication with said annular recess;
annular seals are arranged around said holding tube and at longitudinal ends of said annular recess to seal said annular recess from the test gas in said holding tube.

9. A breathing mask testing system according to claim 1, wherein said test head comprises a testing hard head part formed of a hard material and includes a face side with the mouth opening to the respiration tube and a soft face front of a defined thickness applied to said face side of said hard head part, said soft face front having a simulated human face surface defining said mask seal contact surface and with a soft face front mouth opening corresponding to said mouth opening to the respiration tube.

10. A breathing mask testing system according to claim 9, wherein an inner contour of said soft face front and an outer contour of the face side of the hard material form a self-adhesive surface interface for attachment of the soft face front to said face side of said hard head part.

11. A breathing mask testing system according to claim 9, wherein said soft face front is formed of polyurethane with a resistant film covering at said simulated human face surface.

12. A breathing mask testing system according to claim 9, wherein said soft face front is detachably connected to said hard head part.

13. A breathing mask testing system according to claim 9, wherein said hard head part comprises a contoured hard head back portion for engagement by mask straps, said hard head back portion extending to an opposite side of said face side, said face side having a hard head part face contour surface with a shape corresponding to said simulated human face surface at a reduced dimension, said hard back portion ending at an interface rim region having a rim dimension for contact with an edge of said soft face front of a defined thickness.

* * * * *